No. 643,263. Patented Feb. 13, 1900.
W. C. BRADFORD.
WHEELED SCRAPER.
(Application filed May 11, 1899.)

(No Model.) 2 Sheets—Sheet 1.

Witnesses,

Inventor,
Walter C. Bradford
By Dewey Strong & Co.
Attys

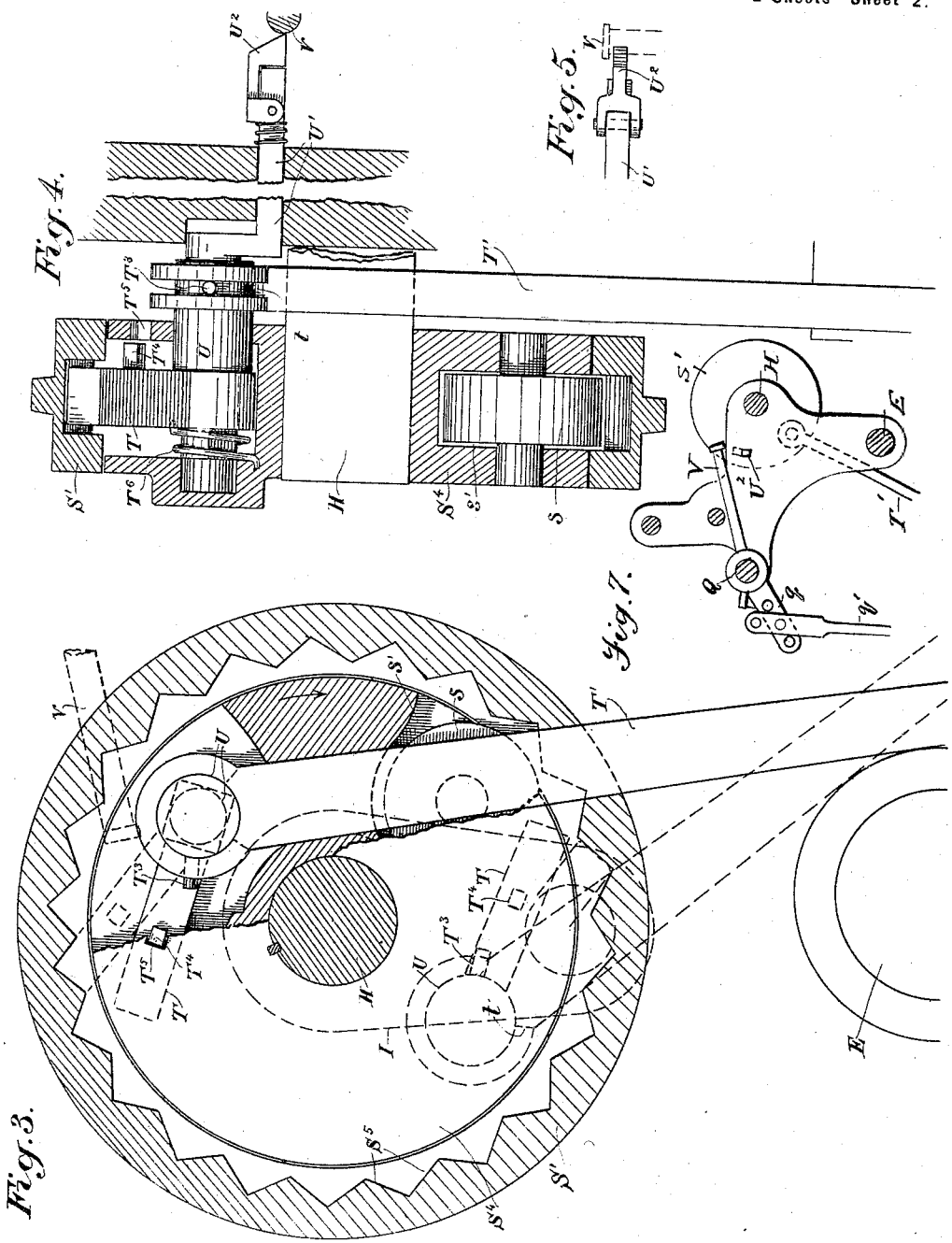

UNITED STATES PATENT OFFICE.

WALTER C. BRADFORD, OF ARBUCKLE, CALIFORNIA.

WHEELED SCRAPER.

SPECIFICATION forming part of Letters Patent No. 643,263, dated February 13, 1900.

Application filed May 11, 1899. Serial No. 716,346. (No model.)

*To all whom it may concern:*

Be it known that I, WALTER C. BRADFORD, a citizen of the United States, residing at Arbuckle, county of Colusa, State of California, have invented an Improvement in Wheeled Scrapers; and I hereby declare the following to be a full, clear, and exact description of the same.

My invention relates to improvements in scrapers of that class which are mounted upon wheels and comprise an excavating and transporting pan and carrier.

My invention consists of a two-part pan acting as a scraper, these parts being suspended from a framework which is mounted upon bearing-wheels, and in conjunction with this are mechanisms by which the pan is lowered and tilted, with the cutting edge adapted to engage the ground, whereby the device may be loaded, a means by which the pan is suspended above the ground when loaded, so as to be transported to any desired point, and means for opening and separating the two parts to discharge the load at any desired point.

The invention also comprises details of construction, which will be more fully explained by reference to the accompanying drawings, in which—

Figure 1:
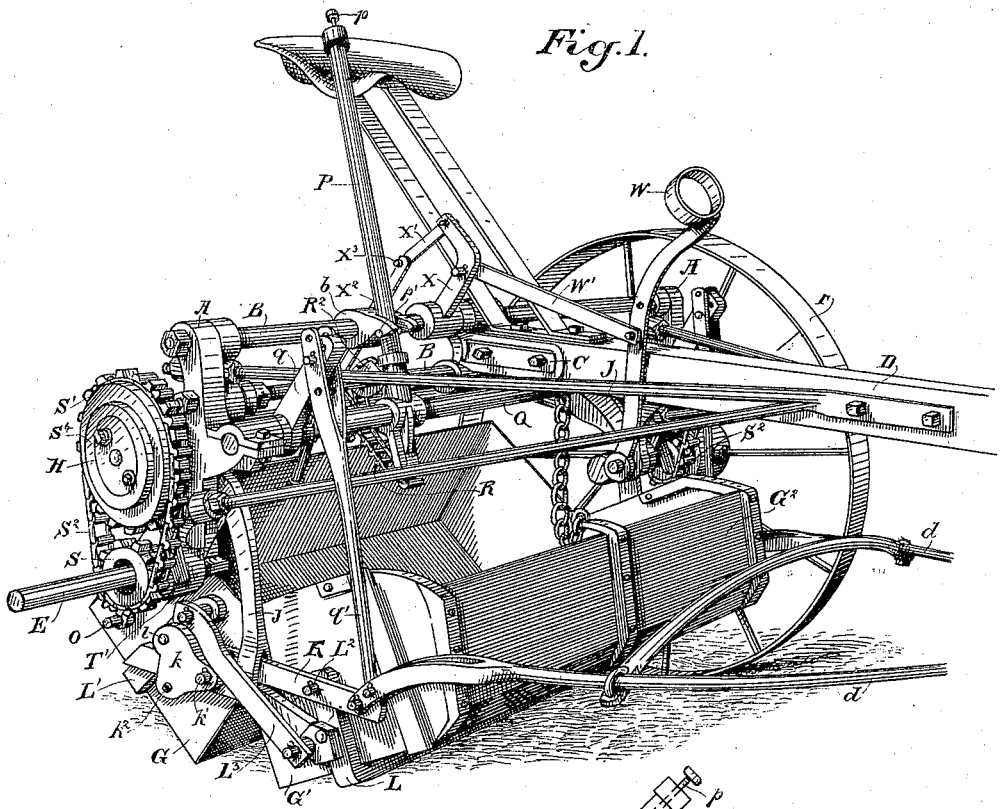
Figure 2:
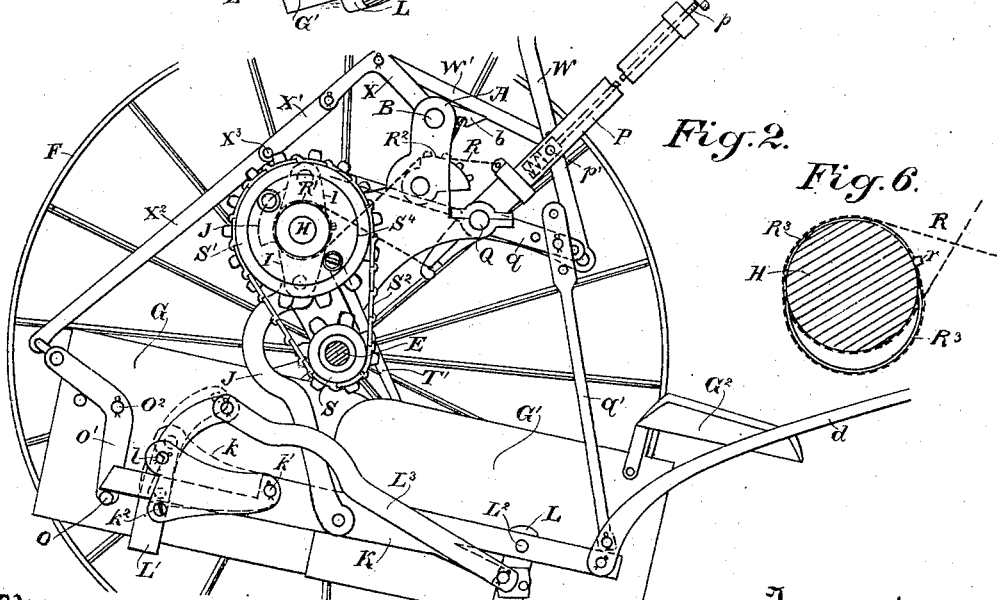
Figure 6:
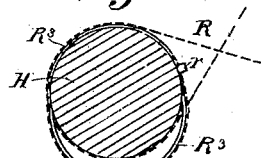

Figure 1 is a general perspective view of the apparatus. Fig. 2 is a side view. Fig. 3 is an enlarged section of the pawl-and-ratchet mechanism for raising the loaded carrier. Fig. 4 is a section at right angles to Fig. 3, showing the engaging and disengaging mechanism of the pawl. Fig. 5 is a detail plan of the trip-latch. Fig. 6 is an enlarged section of the sprocket-shaft, showing the spring at the lower part. Fig. 7 is a detail sectional view looking toward the opposite side of Fig. 2 and showing particularly the crank V and tripping mechanism in place.

A A are the ends of the framework, which may be cast or otherwise formed in suitable or desirable shape, and these are connected by shafts B extending between them. The centers of these shafts have fixed to them the plates or castings C, which serve for the attachment of the pole D. To the lower end of these castings are fixed the spindles or shafts E, upon which the wheels F are turnable, and these wheels serve to support the apparatus.

The scraper is composed of two sections G G', which when closed meet centrally to form a continuous pan, and a door $G^2$ is hinged to the front, so as to be opened upwardly when the scraper is being filled and which may be closed after the scraper has been filled, so that it can be transported to any desired point without the escape of its contents.

H is a shaft extending between the castings A and turnable in journal-boxes thereon. Upon this shaft are fixed the short crank-arms I, and to the ends of these arms the upper ends of stout links J are pivoted. The lower ends of these links are pivoted to stout side bars K.

The sections G and G' of the scraper have bars bent into the form of yokes, the horizontal portions of which extend beneath the bottoms and about centrally of each section G G', and the sides are upturned at the ends of the box-sections G G', as shown at L.

The upper end of the yoke L, which supports the front portion of the scraper, is pivoted to the bar K, as shown at $L^2$, and the upper end of the yoke L', which supports the rear portion of the scraper, extends above the bar K. A link $L^3$ connects this extended upper end of the rear yoke with the front yoke L at a point below the fulcrum-pin.

The rear ends of the bars K at each end of the scraper form latches which are supported by pins O, projecting from lever-arms O', which are pivoted, as shown at $O^2$, and are turnable by a mechanism to be hereinafter described, so as to disengage the pin O from the bar K. When the bar is supported upon this pin, as shown in Fig. 2, the parts G G' of the scraper are in line with each other and closed to form a single structure. When this pin has been withdrawn, it disconnects the bar K, and the link $L^3$, which connects the yokes L L', acting in unison with the parts just mentioned, presses the two parts G G' of the scraper away from each other and opens them centrally for discharge of their contents, as shown plainly in Fig. 1.

Attached to the locking-bar K at k' is a triangular plate $k$, which is also connected with the brace L' at $l$ and having at its lower angle a screw $k^2$, which projects underneath the lower edge of bar K. When working over very rough ground, this screw $k^2$ is entirely removed, which allows the sections to yield to larger obstructions without disconnecting the locking-bar K, as shown in dotted lines on Fig. 2.

The mechanism by which these results are produced is as follows: A lever-arm P is mounted upon a shaft Q, which is suitably journaled between the castings A, which form the ends of the main frame, and this lever has chains R, the ends of which connect with it above and below the fulcrum-shaft Q. These chains are crossed, and the bight passes around a sprocket-wheel R', fixed upon the shaft H, one end of a chain connecting with the lower part of the lever P, and the other end, passing over an eccentric sprocket-segment $R^2$, connects with the lever P, as before stated, above the fulcrum-point, so that a movement of the lever P in either direction will act to turn this sprocket-wheel, and with it the shaft to which it is attached. This shaft carries the crank-arms I, as previously described. Therefore a forward movement of the lever P when the pan is in its elevated position will act through the chain R to rotate the sprocket-wheel R', the shaft, and the crank-arms I, and the links J will thus be lowered, allowing the pan to be depressed to the ground. The two parts of the chain passing around the sprocket serve to hold it and let the pan down gently until the cranks I are underneath the shafts H and the pan is close to the ground. The lever is then pressed forward still further in order to lower the front end of the pan for loading. This further movement turns the eccentric toothed segment $R^2$, thus allowing the portion of the chain which passes over it to slacken off, and as the rear end of the pan is supported by the bars K, resting on the latch-pins O, the front end of the pan will be depressed lower than the rear end by means of crank-arms $q$, fixed to the shaft Q and operated by the lever P. Depending from these crank-arms $q$ are the links $q'$, their lower ends connecting with the rods $d$, which extend forward beneath the pole D. To the rod $d$ is also attached the forward end of the lock-bar K, so that by throwing forward the lever P the lock-bar K, by its intermediate connections with the lever, is pressed down, thus forcing the forward end of the pan downward to scrape up the material into the pan, thus bringing the front edge into position to excavate the earth and load itself when the machine is drawn forward by the team. The lower part of the shaft around which the chain passes has a stout curved spring $R^3$ attached to it, as shown in Fig. 6, and this yields and takes up any slack in the chain caused by the relaxing of the portion which passes over the eccentric segment $R^2$.

Movement in the opposite direction will correspondingly compress this spring and cause it to yield when the chain is again shortened up. After the pan has been loaded it is necessary to raise it from the ground; but the load in the pan is now so great that it cannot be raised by the operation of the lever P. It is therefore necessary to bring the power of the team to bear upon the pan to raise it, and this is effected by the following mechanism:

Connected with each of the bearing-wheels F is a sprocket-wheel S, and upon the outer ends of the shaft H are similar sprockets S', around which sprocket-chains $S^2$ pass. The teeth of the sprocket S' are formed upon the exterior periphery of an annular ring, the interior of which fits over a central disk $S^4$, which is keyed to the shaft H, as plainly shown in Fig. 3, and which I have shown in enlarged section, but have omitted the exterior sprocket-teeth of the ring S'. This sprocket-ring S' is held in place by a roller S, mounted in a recess $s'$, made in the central disk $S^4$. This roller is of such a diameter that its periphery projects a short distance into the annular chamber in which are formed the teeth $S^5$, thus preventing the ring S' from being pulled off sidewise from the central disk. The interiors of these sprocket-rings S' are toothed to form ratchets, as shown at $S^5$, and these ratchets are engaged at the proper time by pawls T, so that when these pawls T have been thrown into engagement with the ratchet-teeth $S^5$ of the sprocket-rings S', these sprocket-rings being continually driven by means of the chains $S^2$, which connect it with the sprockets S, will act, through the pawls T, to rotate the disks $S^4$, to which the pawls are pivoted, and as these disks are keyed to the shaft H the shaft H will be turned in unison, and the cranks I, which at the commencement of the operation were depending below the shaft for the purpose of lowering the pan, will be turned to the upper side of the shaft, thus raising the whole pan bodily from the ground, and when the cranks have reached this point the pawl will be disengaged automatically from the continuously-revolving ratchet S' by the following mechanism:

Loosely mounted upon the short shaft U is a hanger T', its upper end being slotted to allow a pin $T^3$, fixed to shaft U, to travel in this slot and forming shoulders $t$ by this construction. Now when the pawl T is released and engages with the teeth $S^5$ the central disk is rotated in the direction of the arrow, Fig. 3, until it reaches the position shown in dotted lines. At this point the cranks I will have reached their highest vertical positions and their further movements must be arrested. This is effected by one of the shoulders $t$ of the hanger T, which will come in contact with the pin $T^3$, moving the latter toward the center by the continued movement of disk $S^4$, and as the pawl T is fixed rigidly to the shaft U this inward motion is imparted to the pawl also, and it is consequently forced out of its engagement with the ring S' until it engages the locking-slot T⁵. When the pan is let down again by means of lever P, the shaft U and hanger T are brought back to their former position to be again operated by the arm U'. The links J are so bent as to encircle the shaft H when the cranks I are thus turned upward, and the cranks pass far enough beyond the center so that the weight of the loaded pan will not tend to turn the shaft back and allow it to again drop. In order to engage this pawl T with the ratchet-teeth S, I have shown a mechanism which is as follows:

The pawl T has a pin or spur $T^4$ projecting from its side, and this normally enters a corresponding hole $T^5$ in the side of the central portion $S^4$ and is retained in this position by means of a spiral spring $T^6$, which presses against the shaft which carries the pawl T, forcing the shaft to one side in line with its axis far enough to carry the pin into this hole $T^5$ when it is in line therewith. The operation of the lever-arm T' previously described, by which the pawl is turned and disengaged from the ratchet-teeth, also brings it in line with this hole, and the action of the spring causes the pin $T^4$ to enter the hole $T^5$, and this retains the pawl out of engagement with the ratchet until again released. When it is released, the same spring acts by its torsional force to throw the pawl upward into engagement with the ratchet-teeth.

The pivot-shaft U, which carries the pawl, is movable in a line with its axis for the purpose of engaging and disengaging the pin $T^4$. It is normally pressed by the spring $T^6$, as previously described, so that the pin $T^4$ enters the hole $T^5$, and the pawl is thus held out of engagement with the ratchet.

The arm U' extends outward, as shown in Fig. 4, and is movable with the pawl-shaft U, and this arm carries upon its outer end a beveled latch $U^2$, which is fulcrumed to it, as shown.

V is an arm or spur carried upon the shaft Q of the hand-lever P, and this pin operates as follows: When the pan has been loaded and it is desired to raise it from the ground, the lever-arm P is drawn backwardly, it being movable a short distance without acting upon the pan by reason of the construction and attachment of the chain R. This movement turns the shaft sufficiently to bring the pin V into contact with the beveled latch $U^2$, as shown in Fig. 4, and this pushes the arm U' and the pinion-shaft U to one side until the pin $T^4$ is withdrawn from the hole $T^5$, and the pawl T, turned by the spring $T^6$, is thrown into engagement with the ratchet-teeth $S^5$, whereby the power of the team is brought to bear to raise the pan, as before described.

In order to raise the load, the lever P is thrown back, which first causes the trip V to operate shaft H, and while this movement takes place the lever P is fully thrown back until its latch-pin $p'$ engages the latch $b$, which will prevent the crank-arms I tilting to either side, and the load may then be carried to any place. The lever P is released by pushing the rod $p$ downward, and with it the pin $p'$ against its spring, thereby freeing it from the latch $b$. The lever P is made hollow to admit the latch actuating.

The beveled latch $U^2$ is pivoted to the end of the arm U', as shown, and it normally rests upon the top of this arm, so that pressure from above against the inclined face of $U^2$ will force the arm and its connections endwise; but when the lever P is moved in the opposite direction and the spur V passes the latch $U^2$ from below the latter will turn freely upon its pivot-point until the pin has passed it and will then be forced back or dropped to its normal position by spring or by gravitation.

The load having been transported to any point where it is desired to dump it, the dumping is effected by means of a foot-lever (shown at W, Figs. 1 and 2) and connected by a link W' with a bent lever X, fulcrumed and turnable upon one of the shafts B, which connect the end castings A of the frame. This bent lever is connected by a link X' with a connecting-rod $X^2$ by what is termed a "rule-joint" $X^3$, this joint allowing the parts to bend with relation to each other in one direction, but preventing their passing beyond a straight line in the other direction. When the foot-lever W is thus pressed forward, it acts through the link W', the bent lever X, and the connections between it and the rod $X^2$, the lower end of which is connected with the bent lever O', fulcrumed to the rear part G of the pan, as previously described. The pull upon the end of this lever turns it about its fulcrum-pin $O^2$ until the latch or stop O is withdrawn sufficiently to allow the end of the bar K to drop, and this allows the parts G G' of the pan to separate in the center, the action of the links $L^3$, which connect the yokes, as previously described, serving to push these parts away from each other, as plainly shown in Fig. 1.

Having thus described my invention, what I claim as new, and desire to secure by Letters Patent, is—

1. A scraper comprising a two-part pan, a framework mounted upon wheels, a shaft extending from the side between the wheels having crank-arms and links, the upper ends of which connect with said crank-arms, bars extending across the meeting ends of the pan-sections, to which the lower ends of the links are centrally connected, yoke-shaped bars extending across the bottom of the pan-sections with their ends upturned and connected with the suspending-bars, substantially as described.

2. A scraper comprising a two-part pan, bars upon which the ends of the pan-sections are suspended and links connected with crank-arms upon a shaft journaled in the framework of a machine whereby the sections may be raised or depressed with relation thereto.

3. In a wheeled scraper, the two-part-pan sections with supporting-yokes beneath, bars extending across the meeting ends of the sections, to which bars the yokes are connected, and a link connecting one of the yokes above its center of motion with the other below said center, whereby the pans are opened or closed with relation to each other.

4. In a wheeled scraper, the two-part pans meeting centrally and having supporting-yokes beneath each and transverse bars across the meeting ends of the pan-sections to which the yokes are connected, diagonal links connecting one of the yokes above the center of oscillation, with the other below said center, a latch mechanism by which the rear ends of the bars are engaged when the sections are closed and a shaft having crank-arms and links connecting said arms with the transverse bars whereby the pan-sections may be raised or depressed by the turning of the shaft.

5. In a wheeled scraper, the sectional pan with supporting-framework and suspending-links as shown, a turnable shaft having crank-arms to which the upper ends of the suspending-links are connected, a lever and a fulcrum-shaft about which it is turnable, a chain having the ends connecting with said lever at points above and below the fulcrum, a pulley upon the crank-shaft about which the chain passes whereby the movement of the lever serves to turn the shaft and depress the pans.

6. In a wheeled scraper, the two-part sectional pans with connecting and suspending arms, a shaft having cranks to which the upper ends of the suspended arms are connected, a lever and intermediate chain connection whereby the shaft is turned to depress the pans without separation, rocker-arms fixed to the lever fulcrum-shaft and links connecting said arms with the front section of the scraper whereby the latter may be depressed for loading.

7. In a wheeled scraper, the two-part sectional pan, a supporting-framework, suspending-links and a shaft with rocker-arms to which the upper ends of the links are connected whereby the two parts of the scraper may be suspended above the ground or lowered with relation thereto, mechanism by which the pan may be tilted with the front edge engaging the ground so as to automatically load itself, a mechanism for raising the loaded scraper consisting of sprocket-wheels driven by the bearing-wheels of the machine, other sprockets and intermediate chain by which they are rotated, disks secured to the rocker-shafts turnable with relation to the sprockets, and pawl-and-ratchet mechanism whereby the two may be connected so that the rocker-shaft will be turned by power derived from the main bearing-wheels, and the crank and rocker arms turned to raise the pan and its load.

8. A mechanism for connecting and disconnecting the driving-sprocket and the driven disk consisting of ratchet-teeth formed in the interior of the sprocket-rim, disks fixed upon the shaft which carries the rocker-arms, by which the pan is raised and lowered, pawls carried by said disks and mechanism by which said pawls are thrown into engagement with the ratchet-teeth whereby the shaft is turned and the load is raised and mechanism by which the pawls are disengaged from the ratchet-teeth when the load has been raised.

9. The continuously-turning sprocket-rim having interior ratchet-teeth, disks fixed upon the shaft which carries the rocker-arms by which the pan is raised or lowered, a pawl mounted upon a shaft, said shaft having an end movement, a pin projecting from the side of the pawl and a hole in the side of the disk or casing with which the pin engages to hold the pawl normally out of engagement with the ratchet.

10. Continuously-turning sprocket and ratchet rims, the interior disks or flanges about which they are turnable, said disks being fixed to the rocker-shaft by which the pan is raised or depressed, a pawl mounted upon a shaft which has an end movement, a spring by which said pawl is thrown into engagement with the ratchet-teeth on the interior of the rim, a pin upon the side of the pawl, a hole in the disk with which said pin engages when the pawl is out of engagement with the ratchet, a latch having a beveled end and an arm connecting it with the pawl fulcrum-shaft and a contact-pin movable by a hand-lever, said contact-pin striking the latch when turned and disengaging the pawl-holding pin whereby the pawl is released and thrown into contact with the ratchet.

11. In a wheeled scraper, the continuously-turning sprocket-rims having interior ratchet-teeth, interior disks fixed upon the rocker-arm shaft by which the pan is raised or depressed, a pawl carried by the disk, a pin by which it is normally held out of contact with the ratchet-teeth of the rim, a disengaging-latch and a contact-pin by which the pawl is released and a spring by which it is thrown into contact with the ratchet, a swinging arm depending from the pawl-shaft, a stop against which said arm contacts after the shaft has been revolved and the rocker-arms turned to a position above it, and a pin carried by the swinging arm and engaging the pawl so as to automatically throw it out of engagement with the ratchet and stop the shaft while the ratchet continues to revolve.

12. In a wheeled scraper, a two-part pan with rocker-arms suspending-links, transverse bars extending across the ends of the pan-sections, and by which said sections are supported, latches by which the rear ends of said arms are supported when the pan is closed, a foot-lever, intermediate links and bent levers connected with each other and with the foot-lever whereby the supporting-bars of the pans are disengaged and the pans allowed to tilt and discharge the load.

In witness whereof I have hereunto set my hand.

WALTER C. BRADFORD.

Witnesses:
C. E. WEST,
M. D. GLEASON.